: (12) United States Patent
Gumaste et al.

(10) Patent No.: US 7,457,540 B2
(45) Date of Patent: Nov. 25, 2008

(54) SYSTEM AND METHOD FOR SHAPING TRAFFIC IN OPTICAL LIGHT-TRAILS

(75) Inventors: Ashwin Anil Gumaste, Dallas, TX (US); Susumu Kinoshita, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 555 days.

(21) Appl. No.: 11/118,899

(22) Filed: Apr. 29, 2005

(65) Prior Publication Data

US 2006/0245755 A1 Nov. 2, 2006

(51) Int. Cl.
*H04B 10/20* (2006.01)
*H04J 14/00* (2006.01)

(52) U.S. Cl. .............................. 398/58; 398/59; 398/66; 398/68

(58) Field of Classification Search .................. 398/31, 398/30, 59, 58, 66, 69, 68, 71, 42, 49, 57; 370/431, 432, 479, 254, 258
See application file for complete search history.

(56) References Cited

U.S. PATENT DOCUMENTS

| | | | |
|---|---|---|---|
| 4,651,316 A | 3/1987 | Kocan et al. | 370/462 |
| 5,258,978 A | 11/1993 | Cloonan et al. | 370/411 |
| 5,469,428 A | 11/1995 | Tokura et al. | |
| 5,724,166 A | 3/1998 | Nakata | |
| 5,854,700 A | 12/1998 | Ota | |
| 5,903,371 A | 5/1999 | Arecco et al. | |
| 6,160,648 A | 12/2000 | Oberg et al. | |
| 6,169,746 B1 | 1/2001 | Ueda et al. | 370/466 |
| 6,195,186 B1 | 2/2001 | Asahi | |
| 6,504,849 B1 | 1/2003 | Wang et al. | 370/455 |
| 6,567,194 B1 | 5/2003 | Badr | 398/1 |

(Continued)

FOREIGN PATENT DOCUMENTS

WO WO 03/104849 A2 12/2003

OTHER PUBLICATIONS

Banaerjee et al., "Generalized Multiprotocol Label Switching: An Overview of Routing and Management Enhancements," IEEE Communications Magazine, Jan. 2001, pp. 144-149.
Bertsekas, Dimitri, "The Auction Algorithm: A Distributed Relaxation Method for the Assignment Problem," Report LIDS-P-1653, Mar. 1987, Revised Sep. 1987, pp. 1-27.
Chlamtac et al., "Bandwidth Management in Community Networks," Center for Advance Telecommunications Systems and Services, pp. 1-11, 2002, IWDC, LNCS 2571.
Chlamtac et al., Lightpath Communications: An Approach to High Bandwidth Optical WAN's, IEEE Transactions on Communications, vol. 40, No. 7, Jul. 1992, pp. 1171-1182.

(Continued)

*Primary Examiner*—M. R. Sedighian
(74) *Attorney, Agent, or Firm*—Baker Botts L.L.P.

(57) ABSTRACT

A method for transmitting traffic in an optical network includes establishing a light-trail in the optical network between a number of nodes. The light-trail couples the nodes and is associated with one of a number of wavelengths in the network. The method also includes, at one or more of the nodes, receiving traffic from one or more client devices of the node to be communicated over the light-trail to a destination node and determining one or more service types associated with the received traffic. Furthermore, the method includes determining traffic shaping information for each service type based on information relating to the arrival of traffic associated with the service type at the node. The traffic shaping information indicating to the destination node the rate at which the traffic associated with each service type should be communicated from the destination node to one or more client devices of the destination node. In addition, the method includes transmitting the traffic and the determined traffic shaping information for each service type to the destination node.

14 Claims, 4 Drawing Sheets

U.S. PATENT DOCUMENTS

| | | | |
|---|---|---|---|
| 6,594,232 | B1 | 7/2003 | Dupont |
| 6,631,134 | B1 | 10/2003 | Zadikian et al. |
| 6,701,085 | B1 | 3/2004 | Muller |
| 6,728,484 | B1 | 4/2004 | Ghani .................. 398/42 |
| 6,766,113 | B1 | 7/2004 | Al-Salameh et al. |
| 6,775,477 | B2 | 8/2004 | Badr ..................... 398/1 |
| 6,795,394 | B1 | 9/2004 | Swinkels et al. |
| 6,850,711 | B2 | 2/2005 | Tsuruta ............... 398/168 |
| 6,882,799 | B1 | 4/2005 | Beshai et al. |
| 6,889,007 | B1 | 5/2005 | Wang et al. ........... 398/79 |
| 7,016,363 | B1 | 3/2006 | Reed et al. |
| 7,023,796 | B2 | 4/2006 | De Girolamo et al. |
| 7,031,299 | B2 | 4/2006 | Chaudhuri et al. |
| 7,088,920 | B2 * | 8/2006 | Krishnaswamy et al. ...... 398/58 |
| 7,184,663 | B2 | 2/2007 | Kinoshita et al. |
| 7,218,854 | B1 | 5/2007 | Unitt et al. |
| 7,266,296 | B2 | 9/2007 | Ovadia et al. |
| 7,308,198 | B1 | 12/2007 | Chudak et al. |
| 2002/0114030 | A1 | 8/2002 | Dwivedi et al. |
| 2003/0189920 | A1 | 10/2003 | Erami et al. |
| 2003/0223104 | A1 | 12/2003 | Kinoshita et al. |
| 2003/0223682 | A1 | 12/2003 | Kinoshita et al. |
| 2003/0235153 | A1 | 12/2003 | Lee et al. |
| 2004/0034753 | A1 | 2/2004 | Jeddeloh |
| 2004/0052530 | A1 | 3/2004 | Tian et al. |
| 2004/0234263 | A1 | 11/2004 | Ovadia et al. |
| 2004/0252995 | A1 | 12/2004 | Ovadia et al. |
| 2005/0013613 | A1 | 1/2005 | Stevenson et al. |
| 2005/0088964 | A1 | 4/2005 | Yang et al. |
| 2005/0191054 | A1 | 9/2005 | Aoki et al. |
| 2006/0013584 | A1 | 1/2006 | Miyazaki |
| 2006/0056279 | A1 | 3/2006 | Pronk et al. |
| 2006/0188258 | A1 | 8/2006 | Gumaste et al. |
| 2006/0210268 | A1 | 9/2006 | Gumaste et al. |
| 2006/0210273 | A1 | 9/2006 | Gumaste et al. |
| 2006/0222360 | A1 | 10/2006 | Gumaste et al. |
| 2006/0228112 | A1 | 10/2006 | Gumaste et al. |
| 2006/0245755 | A1 | 11/2006 | Gumaste et al. |
| 2007/0019662 | A1 | 1/2007 | Gumaste et al. |
| 2007/0047958 | A1 | 3/2007 | Gumaste et al. |
| 2007/0121507 | A1 | 5/2007 | Manzalini et al. |
| 2007/0255640 | A1 | 11/2007 | Gumaste et al. |

OTHER PUBLICATIONS

Chlamtac et al., "Light-Trails: A Solution to IP Centric Communication in the Optical Domain," 11 pages, Center for Advance Technology Systems and Services, University of Texas at Dallas, Texas 75083, USA, Quality of Service in Multiservice IP Networks, Second International Workshop, QoS-IP 2003, Feb. 2003.

Dolzer et al., "Evaluation of Reservation Mechanisms for Optical Burst Switching," 8 pages, 2001, AEU Int. J. Electron. Commun. 55 No. 1, 1-1, 2001.

Fang et al., "Optimal Light Trail Design in WDM Optical Networks," IEEE Communications Society, 2004 IEEE, pp. 1699-1703.

Foster, "The Grid Blue Print for a New Computing Infrastructure," Morgan Kauffman, Nov. 1998, pp. 479-532, 1998.

Frederick et al., "Light Trails: A Sub-Wavelength Solution for Optical Networking," 2004 IEEE, 2004 Workshop on High Performance Switching and Routing, Apr. 19-21, 2004.

Fumagalli et al., "The Multi-Token Inter-Arrival Time (MTIT) Access Protocol for Supporting IP over WDM Ring Network," 1999 IEEE, pp. 586-590.

Ghani et al., "On IP-Over-WDM Integration," IEEE Communications Magazine, Mar. 2000, pp. 72-84, WDM Optical Networks: A Reality Check.

Gumaste et al., "A Scheduling Procedure for Control Signaling in Optical Burst Switched Network," in Proceedings for the First International Conference on Optical Communications and Networks, Nov. 11-14, 2002, pp. 190-193.

Gumaste et al., Bifurcated Traffic and Channel Assignment (BITCA) to Interconnected Metro Rings, 3 pages, OFC 2002.

Gumaste et al., "Light-Frames: A Pragmatic Framework for Optical Packet Transport," IEEE Communications Society, pp. 1537-1542, 2004.

Gumaste et al., "Light-Trail and Light-Frame Architectures for Optical Networks," PHD Thesis, University of Texas Dallas, Dec. 2003.

Gumaste et al., "Light-Trails: A Novel Conceptual Framework for Conducting Optical Communications," Center for Advanced Telecommunications Services and Studies, 7 pages, 2003.

Gumaste et al., Light Trails: An Optical Solution for IP Transport, J. Opt. Net., vol. 3, 2004, pp. 261-281, Center for Advanced Telecommunications Systems and Services, The University of Texas at Dallas, May 2004, vol. 3, No. 5, Journal of Optical Networking, pp. 261-281.

Gumaste et al., "Heuristic and Optimal Techniques for Light-Trail Assignment in Optical WDM Networks," Photonics Networking Laboratory, 7 pages, unknown.

Gumaste et al., Mesh Implementation of Light Trails: A Solution to IP Centric Communication, 6 pages, Center for Advanced Telecommunications Services and Studies, unknown.

Gumaste et al., "Next-Generation Optical Storage Area Networks: The Light-Trails Approach," Optical Storage Area Networks, IEEE Communications Magazine, Mar. 2005, pp. 72-79.

Gumaste et al., "Optimizing Light-Trail Assignment to WDM Networks for Dynammic IP Centric Traffic," pp. 113-118, unknown.

Gumaste et al. Performance Evaluation and Demonstration of Light Trails in Shared Wavelength Optical Networks (SWONSs), 2 pages, date unknown.

Gumaste et al., "Providing Bandwidth on Demand to End-Users by Adaptations to a GMPLS Framework: The Light-Trails Approach," National Fiber Optics Engineers Conference, 2003 Technical Proceedings, pp. 1137-1141.

Gumaste et al., "Optical Implementation of Resilient Packet Rings Using Light-Trails," Advanced Computer Network and Architecture Laboratory, 7 pages, unknown.

Humblet, "Models of Blocking Probability in All-Optical Networks With and Without Wavelength Changers," IEEE Journal on Selected Areas in Communications, Jun. 1996, vol. 14, No. 5, ISACEM, 11 pages.

Kinoshita, S.. "Broadband Fiber Optic Amplifiers," OFC 2001, Optical Fiber Communications Conference and Exhibit, Mar. 17-22, 2001, 5 pages.

Ota et al., "High-Speed, Burst-Mode, Packet-Capable Optical Receiver and Instantaneous Clock Recovery for Optical Bus Operation," Journal of Lightwave Technology, vol. 12, No. 2, Feb. 1994, pp. 325-331.

Qiao et al., "On an IP-Centric Optical Control Plane" Intelligence in Optical Networks, IEEE Communication Magazine, Sep. 2001, pp. 88-93.

Ramaswami et al., "Routing and Wavelengths Assignment in All-Optical Networks," IEEE/ACM Transactions on Networking, Oct. 1995, vol. 5, No. 3, pp. 489-500.

Resilient Packet Ring Alliance, "An Introduction to Resilient Packet Ring Technology," A White Paper by the Resilient Packet Ring Alliance, Oct. 2001, pp. 1-16.

Sahasrabuddhe et al., "Fault Management in IP-Over-WDM Networks: WDM Protection versus IP Restoration," IEEE Journal on Selected Areas in Communications, vol. 20, No. 1, Jan. 2002, pp. 21-33, 2002..

Sasaki et al., "The Interface Between IP and WDM and Its Effect on the Cost of Survivability," IEEE Commununications Magazine, Jan. 2003, World Telecommunications Congress 2002 (WTC 2002), pp. 74-79.

Shrinkhande et al., "CSMA/CA MAC Protocols for IP Hornet: An IP Hornet: An IP Over WDM Metropolitan Area Ring Network," Stanford University Optical Communications Research Laboratory, 5 pages, 2000.

Spadaro et al., "Positioning of the RPR Standard in Contemporary Operator Environments," 10 pages, unknown.

Tancevski et al., "Optical Routing as Asynchronous, Variable Length Packets," IEEE Journal on Selected Areas in Communications, vol. 18, No. 10, Oct. 2000, pp. 2084-2093, 2000.

Verma et al., "Optical Burst Switching: A Viable Solution for Terabit IP Backbone," IEEE Network Magazine, vol. 14, No. 6, Nov./Dec. 2000, pp. 48-53, 2000.

Yoo et al., "Just Enough Time (JET): A High Speed Protocol for Bursty Traffic in Optical Networks,:" Proc. IEE/LEOS Tech. G11, Aug. 1997, pp. 26-27.

Yener et al., "Flow Trees: A Lower Bound Computation Tool for Network Optimization, Columbia Tool for Network Optimization," Columbia Univ. Tech. Rep. CUCS-006-94, unknown.

Zhang et al., "Differentiated Multi Layer Survivability in IP/WDM Networks," in Network Operations and Management Symposium, IEEE, New York, 2002, pp. 681-696.

Zhang et al., "A Heuristic Wavelength Assignment Algorithm for Multihop WDM Networks with Wavelength Routing and Wavelength Reuse," in Proc. INFOCOM 94, 1994, pp. 534-543.

Gumaste, "Method and System for Time Sharing Transmission Frequencies in an Optical Network," U.S. Appl. No. 11/061,255, filed Feb. 18, 2004.

Gumaste, "System and Method for Implementing Optical Light-Trials," U.S. Appl. No. 11/080,051, filed Mar. 15, 2005.

Gumaste, "System and Method for Implementing Optical Light-Trials," U.S. Appl. No. 11/080,752, filed Mar. 15, 2005.

Gumaste, "System and Method for Bandwidth Allocation in an Optical Light-Trial," U.S. Appl. No. 11/218,262, filed Aug. 13, 2005.

Gumaste, "System and Method for Transmission and Reception of Traffic in Optical Light-Trails," U.S. Appl. No. 11/095,246, filed Mar. 30, 2005.

Gumaste, "System and Method for Protecting Optical Light-Trails," U.S. Appl. No. 11/098,720, filed Apr. 4, 2005.

Gumaste, "Heuristical Assignment of Light-Trails in a Optical Network," U.S. Appl. No. 11/185,958, filed Jul. 19, 2005.

Gumaste, "System and Method for Bandwidth Allocation in an Optical Light-Trails," U.S. Appl. No. 11/380,812, filed Apr. 28, 2006.

Dutton et al., "Understanding Optical Communications," IBM International Technical Support Organization, Sep. 1998, p. 9, 366, and 367 (3 pages).

Ramaswami et al., "Optical Networks: A Practical Perspective," First Edition, Morgan Kauffman Publications, 1998, pp. 423-462 (41 total pages).

Maille et al., "Multi-Bid Auctions for Bandwidth Allocation in Communications Networks," INFOCOM 2004, Mar. 7-11, 2004, vol. 4, pp. 54-65.

Chiang et al., "Balancing Supply and Demand of Bandwidth in Wireless Cellular: Networks: Utility Maximization Over Powers and Rates," INFOCOM 2004, Mar. 7-11, 2004, vol. 4, pp. 2800-2811.

* cited by examiner

SYSTEM AND METHOD FOR SHAPING TRAFFIC IN OPTICAL LIGHT-TRAILS

TECHNICAL FIELD

The present invention relates generally to optical networks and, more particularly, to a system and method for shaping traffic in light-trails in an optical communication network.

BACKGROUND

Telecommunication systems, cable television systems, and data communication networks use optical networks to rapidly convey large amounts of information between remote points. In an optical network, information is conveyed in the form of optical signals through optical fibers. Optical fibers comprise thin strands of glass capable of transmitting optical signals over long distances with very low loss of signal strength.

Recent years have seen an explosion in the use of telecommunication services. As the demand for telecommunication services continues to grow, optical networks are quickly becoming overburdened by the increasing amount of information communicated over such networks. The addition of new networks or the expansion of existing networks may however be too costly to be practical solutions to this problem. Thus, efficient use of network resources has become an important goal in developing and operating optical networks.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels. By using WDM add/drop equipment at network nodes, the entire composite signal can be fully demultiplexed into its constituent channels and switched (added/dropped or passed through). In such networks, traffic from one network node to another network node are often assigned to a particular wavelength on which the traffic is communicated over the network. By assigning different traffic streams to different wavelengths, interference between different traffic streams is prevented. However, in certain situations, this creates inefficiency in the network. For example, if the traffic from a node that is assigned a particular wavelength does not typically use much of the bandwidth (capacity) associated with the wavelength, then inefficiencies are created.

SUMMARY

A system and method for shaping traffic in optical light-trails in an optical communication network are provided. According to one embodiment, a method for transmitting traffic in an optical network includes establishing a light-trail in the optical network between a number of nodes. The light-trail couples the nodes and is associated with one of a number of wavelengths in the network. The method also includes, at one or more of the nodes, receiving traffic from one or more client devices of the node to be communicated over the light-trail to a destination node and determining one or more service types associated with the received traffic. Furthermore, the method includes determining traffic shaping information for each service type based on information relating to the arrival of traffic associated with the service type at the node. The traffic shaping information indicating to the destination node the rate at which the traffic associated with each service type should be communicated from the destination node to one or more client devices of the destination node. In addition, the method includes transmitting the traffic and the determined traffic shaping information for each service type to the destination node.

Technical advantages of certain embodiments of the present invention may include efficient techniques for using transmission resources on optical networks. More specifically, in particular embodiments of the present invention, nodes of an optical network are capable of establishing an optical "light-trail" that includes one or more other nodes for the transmission of optical traffic. Such a light-trail may be shared by the nodes included in the light-trail to transmit traffic to other nodes included in the light-trail. The use of such light-trails may result in more efficient communication of information in the optical network since a number of nodes can share the bandwidth provided by a wavelength at which the light-trail is established. Nodes using such light-trails may include "burstponders" which convert burst or time-interleaved optical traffic received from the light-trail to seamless and continuous data traffic for delivery to client devices of the node and which convert data traffic received from client devices to optical traffic for transmission on the light-trail. Such a burst ponder allows a node to time share a light-trail while creating an impression to client devices of the node that the wavelength is available on a seamless and continuous basis. Such seamless transmission of traffic to client devices may be accomplished in particular embodiments through the use of an "idle word" that instructs a node receiving traffic on a light-trail how to shape the traffic for delivery to appropriate client devices.

It will be understood that the various embodiments of the present invention may include some, all, or none of the enumerated technical advantages. In addition other technical advantages of the present invention may be readily apparent to one skilled in the art from the figures, description, and claims included herein.

DETAILED DESCRIPTION OF THE DRAWINGS

Figure 1:
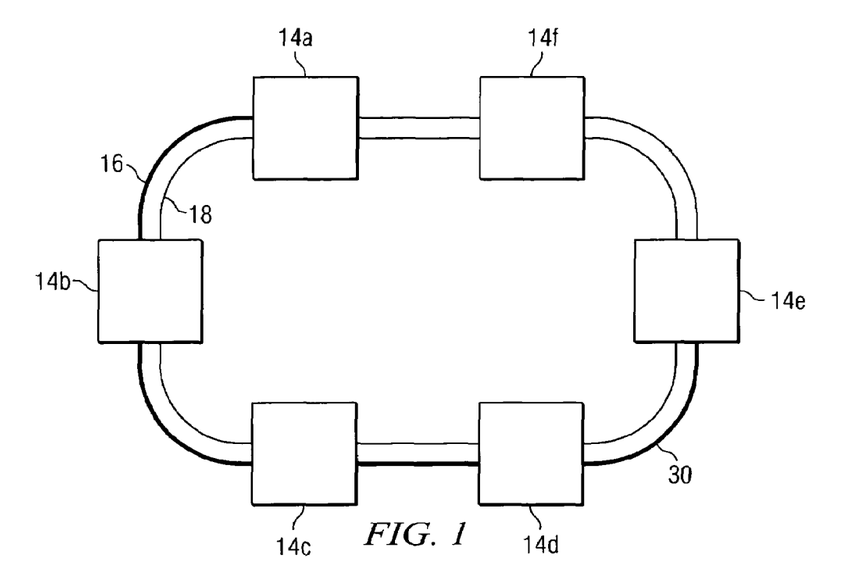
FIG. 1 is a block diagram illustrating an optical ring network in which light-trails may be implemented in accordance with one embodiment of the present invention.

FIG. 1 illustrates an optical network 10 in accordance with one embodiment of the present invention. Optical network 10 includes a plurality of nodes 14 coupled to an optical ring 20. During operation, nodes 14 transmit and receive traffic on optical ring 20 on one of a plurality of wavelengths. In particular, a light-trail, such as light-trail 30 in FIG. 1, may be established over which nodes 14 may transmit optical traffic to other nodes 14 located on that light-trail. Nodes included in a light-trail share the light-trail, as appropriate, to transmit information to other nodes included in the light-trail on a wavelength associated with the light-trail. Thus, a light-trail is a generalization of a light path (an optical wavelength circuit) such that multiple nodes along the path can take part in communication along the path. Therefore, the use of these light-trails addresses the inefficiency discussed above associated with assigning a wavelength for traffic communicated from a single node to another node. In addition, light-trail communications allow optical multicasting and dynamic provisioning.

Figure 2:
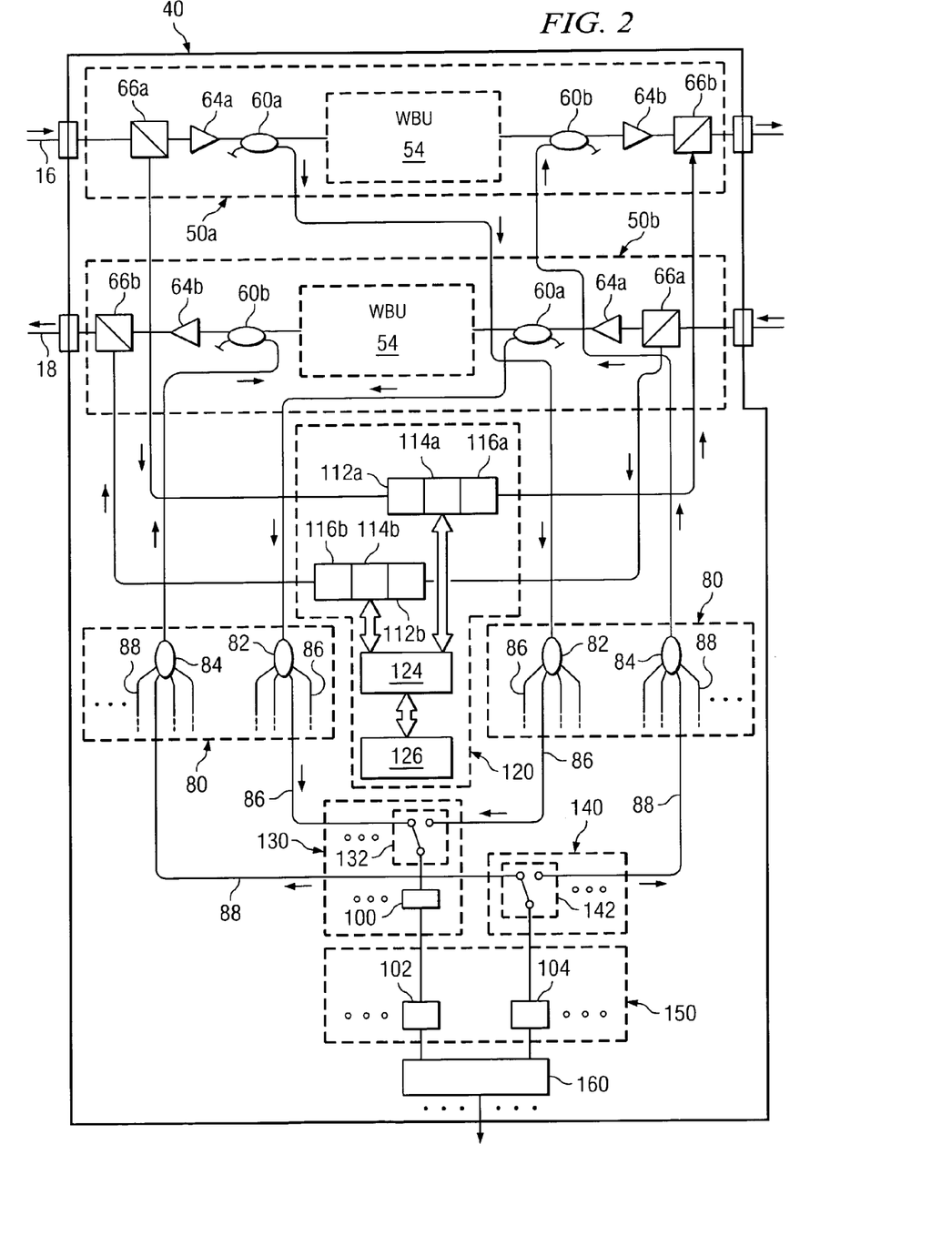
FIG. 2 is a block diagram illustrating a particular embodiment of a node that may be utilized in an optical network implementing light-trails.

Nodes 14 that allow light-trail communication have specific characteristics that enable the nodes 14 to implement light-trails. For example, these characteristics include a drop and continue function (where traffic received by an element of the node is both dropped and forwarded, so as to allow the traffic to continue along the light-trail), passive adding of traffic by the node ("passive" in this context means the adding of traffic without using optical switches that use power, electricity, and/or moving parts), and the use of an out-of-band control channel (as opposed to control signals that are in-band with the data being communicated on the network 10). As described below, FIG. 2 illustrates a particular embodiment of a node 14 including these characteristics.

Referring to FIG. 1, optical ring 20 in the illustrated embodiment comprises a pair of uni-directional fibers, first fiber 16 and second fiber 18, transporting traffic in a counter-clockwise and clockwise direction, respectively. Optical ring 20 optically couples the plurality of nodes 14a-14f, and optical traffic propagates between nodes 14 over optical ring 20. An example light-trail 30 is illustrated in FIG. 1 as a shaded portion of fiber 16. Although a single light-trail 30 is illustrated, nodes 14 may establish light-trails on one or more wavelengths utilized by optical network 10 and multiple non-overlapping light-trails may exist at a particular time on a particular wavelength. To prevent optical interference caused by multiple nodes 14 transmitting simultaneously on a particular light-trail in optical network 10, nodes 14 may utilize particular techniques for sharing the light-trail, as described below. Therefore, there are two levels of "arbitration" associated with light-trails. The first level is the establishment and termination of light-trails to meet particular demands, as well as the "dimensioning" of light-trails (growing or shrinking the trails to meet particular demands). Nodes 14 may be configured to use light-trails to transmit traffic as needed and may establish additional light-trails if the amount of traffic flowing on a particular light-trail exceeds a particular threshold or if a particular node 14 is unable to transmit traffic (due to use of the light-trail by other nodes 14) that cannot be delayed. In general, however, nodes 14 may be configured to establish light-trails based on any appropriate criteria, factors, or considerations.

The second level of arbitration is the allocation of the use of the light-trail to nodes in the light-trail. Nodes may be allocated bandwidth according to defined rules or heuristics, pre-defined bandwidth allocation algorithms, on a dynamic basis, and/or using any other suitable techniques. For example, in particular embodiments of optical network 10, nodes 14 may share use of a light-trail through a "round robin" or "weighted round robin" system, as described below in FIGS. 5A and 5B. In other embodiments, a particular node 14 is granted use of an existing light-trail to transmit optical traffic to other nodes 14 based on a priority associated with that node 14. Thus, when more than one node 14 is attempting to transmit optical traffic on the same light-trail at the same time, an element of optical network 10 may determine which node 14 will be granted use of that light-trail based on a comparison of the priorities of the competing nodes 14. These techniques, or other suitable techniques for sharing a light-trail, may result in more efficient communication of information as transmission by certain nodes 14 or the transmission of certain information may be given priority over other transmissions, allowing, for example, particular nodes 14 to satisfy minimum quality of service (QoS) requirements for their transmissions.

As mentioned above, to coordinate the establishment and allocation of light-trails, optical network 10 supports an optical supervisory channel (OSC) or other out-of-band control channel on which control signals are exchanged between nodes 14 and/or other components of optical network 10. Nodes 14 may exchange control messages on the OSC to initiate and terminate light-trails and to manage use of established light-trails. In a particular embodiment, the OSC represents one or more wavelengths, among a plurality of wavelengths utilized by optical network 10, that are dedicated to control signals. Alternatively, the OSC may represent a separate fiber in optical ring 20 on which nodes 14 may exchange control signals. According to particular embodiments, control signals associated with a particular light-trail may be transmitted on the OSC in the direction of traffic on that light-trail, in a direction opposite to the direction of traffic on that light-trail, or in both directions on the OSC.

Using established light-trails, nodes 14 facilitate communication between a plurality of client devices (not shown) coupled to each node 14 through a plurality of client ports. As described in greater detail below, each node 14 may receive traffic from client devices coupled to that node 14 and add this traffic to optical ring 20 to the optical traffic propagating on optical ring 20. Each node 14 may also receive traffic from optical ring 20 and drop traffic destined for client devices of that node 14, such as personal computers (PCs), telephones, fax machines, hard drives, web servers, and/or any other appropriate communication device. Although FIG. 1, illustrates one embodiment of network 10 that includes a particular number of nodes 14, network 10 may include any appropriate number of nodes 14 configured in any appropriate manner.

In operation, nodes 14 generate optical traffic at one or more wavelengths based on electrical signals received by nodes 14 from client devices coupled to nodes 14 and add this optical traffic to optical traffic propagating on optical ring 20. Nodes 14 also receive and drop traffic propagating on optical ring 20 that is destined for one or more of its clients. For the purposes of this description, nodes 14 may "drop" traffic by transmitting a copy of the traffic to any appropriate components that are a part of or coupled to the relevant node 14. As a result, nodes 14 may drop traffic from optical ring 20 by transmitting the traffic to these components while allowing the traffic to continue to downstream components on optical ring 20. Each node 14 drops and electrically converts traffic received on particular wavelengths at which that node 14 is configured to receive traffic and either does not drop or discards traffic transmitted at other wavelengths. Once traffic is dropped from the optical ring 20, nodes 14 may provide optical-to-electrical conversion of the dropped traffic. Nodes 14 then extract, based on addressing information in the traffic, portions of this traffic destined for client devices coupled to that node 14. In certain embodiments, each node 14 includes, or has associated with it, a switching element which may forward the traffic, or a portion thereof, to one or more of a plurality of client devices based on addressing information.

Since nodes 14 time-share a wavelength associated with a particular light-trail, the data flow patterns through a light-trail dominant network may be somewhat "bursty" in nature due to the interleaving of data streams from multiple nodes 14. However, client devices (typically, Layer-2 devices) associated with a node 14 expect that the optical layer will provide uninterrupted communication to the devices. Therefore, to facilitate an interface between the burst optical layer (due to time sharing of the bandwidth of light-trails) and the continuous client layer, nodes 14 include a device called a burst ponder. A burst ponder is a device that allows a node 14 to time share a wavelength while creating an impression to client devices of the node 14 that the wavelength is available on a seamless and continuous basis. Such a burst ponder is described in further detail in conjunction with FIGS. 2 and 3.

In particular embodiments, a transmitting burst ponder generates and transmits "traffic shaping" information prior to or along with traffic being transmitted by the transmitting burst ponder over a light-trail to indicate to the receiving burst ponder(s) how and when the traffic being transmitted should communicated from the receiving burst ponder to associated client devices. Such traffic shaping allows the seamless and continuous communication of traffic to client devices, even though the transmissions over the light-trail are burst. An example traffic shaping process is described in further detail below in conjunction with FIG. 6.

It should be noted that although FIG. 1 illustrates a particular embodiment and configuration of ring network 10, mesh, linear, or other suitable types of optical networks may be used in accordance with the present invention. In the illustrated embodiment, network 10 is an optical network in which a number of optical channels are carried over a common transmission media at different wavelengths. For example, network 10 may be a wavelength division multiplexed (WDM) network, a dense wavelength division multiplexed (DWDM) network, or any other suitable multi-channel network. Network 10 may represent all or a portion of a short-haul metropolitan network, a long-haul intercity network, or any other suitable network or combination of networks. Network 10 may include, as appropriate, a single uni-directional fiber, a single bi-directional fiber, or a plurality of uni- or bi-directional fibers.

Furthermore, as used herein, "traffic" refers to any type of information that is transmitted, stored, or other processed in the network. For example, such traffic may comprise optical signals having at least one characteristic modulated to encode audio, video, textual, real-time, non-real-time and/or other suitable data. Modulation may be based on phase shift keying (PSK), intensity modulation (IM), and other suitable methodologies. Additionally, the information included in this traffic may be structured in any suitable manner, such as in frames, packets, or in any other appropriate format.

FIG. 2 is a block diagram illustrating a particular embodiment of a node 14 for use in implementing light-trails. As shown, node 14 includes transport elements 50a and 50b, distributing/combining elements 80a and 80b, a managing element 120, a drop element 130, an add element 140, a burst ponder 150, and a switching element 160. Transport elements 50 add traffic to and drop traffic from fibers 16 and 18. More specifically, transport elements 50 may generate one or more copies of optical signals propagating on fibers 16 and 18 for communication of particular portions of the traffic carried in these optical signals to devices coupled to node 14. Additionally, transport elements 50 may include components appropriate to add traffic generated by node 14 or received from client devices of node 14 to fibers 16 and 18. For example, in the illustrated embodiment, each transport element 50 includes a coupler 60a which splits traffic received by transport elements 50 into two copies and forwards one copy of the traffic to drop element 130, while forwarding the other copy along the relevant fiber. Furthermore, each transport element 50 includes a coupler 60b which adds traffic received from add element 140 to traffic already propagating on the associated fiber. Although two couplers 60a and 60b are illustrated in each transport element 50, particular embodiments may include a single coupler that both adds and drops traffic. Such a single coupler may be used, as an example, in particular embodiments which do not include a wavelength blocking unit 54 (as is described below).

Each transport element 50 also includes, in the illustrated embodiment, a wavelength blocking unit (WBU) 54 configured to terminate particular wavelengths of traffic propagating on fibers 16 and 18. As a result, traffic that has already been received by its intended destination or destinations may be terminated at a subsequent node 14. Furthermore, WBU 54 may be used to isolate a light-trail, as described below. Although shown as a functional block in FIG. 2, WBU 54 may represent and/or include suitable components configured in any appropriate manner to provide the functionality of dynamically blocking certain wavelengths and passing other wavelengths. As one example, WBU 54 may represent a wavelength-selective switch (WSS) operable to output any particular wavelength, or set of wavelengths, received at the input of WBU 54 on the output of WBU 54.

As another example, WBU 54 may represent a structure that includes an optical demultiplexer and an optical multiplexer connected by a series of switches. In such an embodiment, the demultiplexer may demultiplex the signal into its constituent channels. The switches may then be dynamically configured to selectively terminate or forward each channel to the multiplexer based on control signals received by each switch. The channels that are forwarded by the switches are received by the multiplexer, multiplexed into a WDM optical signal, and forwarded to downstream elements.

As another example, WBU 54 may represent a collection of tunable filters tuned to allow only traffic on appropriate wavelengths to be forwarded on fibers 16 or 18. In such an embodiment, a coupler of WBU 54 may receive optical signals input to WBU 54 and split the optical signals into a plurality of copies, transmitting each of these copies to a particular tunable filter. Each tunable filter may then selectively pass traffic propagating at a particular wavelength or within a particular range of wavelengths and block traffic propagating at all other wavelengths. Each tunable filter then forwards the passed traffic propagating at the associated wavelength or wavelengths to an output coupler of WBU 54. The output coupler then combines the output of the various tunable filters to produce an output WDM optical signal and forwards the output optical signal to components downstream from WBU 54.

Transport elements 50 may also include appropriate components to allow node 14 to transmit and receive information pertaining to the status and operation of fibers 16 and 18, other nodes, any light-trails established in network 10, or any other appropriate elements or functionality of optical network 10. In particular, each node 14 may include elements to allow node 14 to receive and transmit messages on an optical supervisory channel (OSC). In the illustrated embodiment, each transport element 50 includes an OSC ingress filter 66a that processes an ingress optical signal from its respective fiber 16 or 18. Each OSC filter 66a filters the OSC signal from the optical signal and forwards the OSC signal to a respective OSC receiver 112. Each OSC filter 66a also forwards the remaining optical signal to other components of transport element 50. Each transport element 50 also includes an OSC egress filter 66b that adds an OSC signal from an associated OSC transmitter 116 to the optical signal propagating on the associated fiber 16 or 18 and forwards the combined signal to elements located downstream on fiber 16 or 18. The added OSC signal may be locally-generated data or may be OSC data received by node 14 and passed through managing element 120.

Distributing/combining elements 80 may each comprise a drop signal splitter 82 and an add signal combiner 84. Splitters 82 may each comprise a coupler connected to one optical fiber ingress lead and a plurality of optical fiber egress leads which serve as drop leads 86. Each drop lead 86 may be connected to a drop element 130 associated with a particular local port of node 14. Although the illustrated embodiment shows a splitter 82 coupled to one drop lead 86, splitter 82 may be coupled to any appropriate number of drop leads 86.

Splitter 82 may, in general, represent any appropriate component or collection of components capable of splitting the optical signal received by splitter 82 into a plurality of copies each to be propagated on a particular drop lead 86. In particular embodiments in which four drop leads 86 are implemented, splitters 82 may each specifically comprise a 2×4 optical coupler, where one ingress lead is terminated, the other ingress lead is coupled to a coupler 60 via a fiber segment, and the four egress leads are used as drop leads 86.

Combiners 84 similarly may each comprise a coupler with multiple optical fiber ingress leads, which serve as add leads 88, and one optical fiber egress lead. Each add lead 88 may be connected to an add element 140 associated with a particular port of node 14. In particular embodiments in which combiner 84 is coupled to four ingress leads, combiner 84 may comprise a 2×4 optical coupler, where one egress lead is terminated, the other egress lead is coupled to a coupler via a fiber segment, and the four ingress leads comprise add leads 88. As with splitter 82, the described components of combiner 84 may be replaced by any suitable component or collection of components for combining a plurality of optical signal into a single output signal. Although the illustrated embodiment shows a combiner 84 coupled to one add lead 88, combiner 84 may be coupled to any appropriate number of add leads 88.

Drop elements 130 selectively couple ports of burst ponder 150 to outputs of distributing/combining elements 80 through filters 100, which are each capable of isolating traffic in a different wavelength from each copy of the optical signal created by splitter 82. As a result, drop elements 130 may output particular wavelengths of traffic from fibers 16 and 18 to particular ports of burst ponder 150. Add elements 140 also couple particular ports of burst ponder 150 to combining/distributing elements 80. Drop element 130 and add element 140 may include, respectively, a drop switch 132 and an add switch 142, or other suitable components, to selectively connect associated ports of burst ponder 150 to fiber 16 or 18. Alternatively, add switch 142 may be replaced by a coupler which can split a signal from the associated transmitter 104 and by a pair of shutters (one for each branch of the split signal) that can control whether the signal is added to fiber 16, fiber 18, or both fibers 16 and 18. As a result, drop element 130 and add element 140 may be utilized to support protection switching for node 14. Alternatively, particular embodiments of drop element 130 and add element 140 may omit drop switch 132 and add switch 142, respectively, and couple different ports of burst ponder 150 to each fiber 16 and 18. Moreover, in particular embodiments, node 14 may include multiple drop elements 130 and/or add elements 140, each associated with a particular wavelength supported by optical network 10.

As mentioned above, burst ponder 150 uses traffic shaping techniques to convert burst or time-interleaved optical traffic received from drop elements 130 to seamless and continuous data traffic for delivery to client devices of node 14. Burst ponder 150 also converts data traffic received from client devices to optical traffic for transmission on fiber 16 or 18 in bursts when the node 14 has use of the light-trail. Thus, burst ponder 150 allows node 14 to time share a light-trail while creating an impression to client devices of the node 14 that the wavelength is available on a seamless and continuous basis. Burst ponder 150 may include any appropriate number of receivers 102 operable to receive optical signals and generate electrical signals based on these optical signals and transmitters 104 operable to receive electrical signals and to transmit optical signals based on these electrical signals. Depending on the configuration of node 14, each of these receivers 102 and transmitters 104 may be fixed or tunable. Each of these receivers 102 and transmitters 104 may be a burst-mode receiver or transmitter. Such burst-mode receivers may have burst mode clock and data recovery operation. As described below, switching element 160 may represent any appropriate component or components for transmitting data traffic output by burst ponder 150 to appropriate client devices of node 14 and for transmitting data traffic received from client devices of node 14 to burst ponder 150. Although shown as part of node 14 in FIG. 2, switching element 160 may be physically separate from node 14.

Managing element 120 may comprise OSC receivers 112, OSC interfaces 114, OSC transmitters 116, and an element management system (EMS) 124. Each OSC receiver 112, OSC interface 114, and OSC transmitter 116 set forms an OSC unit for one of the fibers 16 or 18 in the node 14. The OSC units receive and transmit OSC signals for the EMS 124. EMS 124 may be communicably coupled to a network management system (NMS) 126. NMS 126 may reside within node 14, in a different node, or external to all nodes 14.

EMS 124 and/or NMS 126 may comprise logic encoded in media for performing network and/or node monitoring, failure detection, protection switching and loop back or localized testing functionality of the optical network 10. In a particular embodiment, EMS 124 and/or NMS 126 generate, transmit, receive, and/or process control messages associated with the establishment, operation, and termination of light-trails. Any logic included in EMS 124 or NMS 126 may comprise software encoded in a disk or other computer-readable medium, such as memory, and/or instructions encoded in an application-specific integrated circuit (ASIC), field programmable gate array (FPGA), or other processor or hardware. It will be understood that functionality of EMS 124 and/or NMS 126 may be performed by other components of the network and/or be otherwise distributed or centralized. For example, operation of NMS 126 may be distributed to the EMS 124 of nodes 14, and the NMS 126 may thus be omitted as a separate, discrete element. Similarly, the OSC units may communicate directly with NMS 126 and EMS 124 omitted.

EMS 124 monitors and/or controls elements within node 14. For example, EMS 124 may control operation of transmitters 104, receivers 102, and WBU 54 to facilitate the establishment and use of light-trails. In the illustrated embodiment, EMS 124 receives an OSC signal from each of fiber 16 and 18 in an electrical format via an OSC receiver 112 associated with that fiber (the OSC receiver 112 obtains the signal via an OSC filter 66a). This OSC signal may include one or more of multiple types of control messages, as described above. EMS 124 may process the signal, forward the signal and/or loop-back the signal. EMS 124 may be operable to receive the electrical signal and resend the OSC signal via OSC transmitter 116 and OSC filter 66b to the next node on fiber 16 or 18, adding, if appropriate, locally-generated control messages or other suitable information to the OSC.

NMS 126 collects information from all nodes 14 in optical network 10 and is operable to process control messages transmitted by nodes 14 to manage particular aspects of the use of light-trails. For example, in a particular embodiment, NMS 126 may be operable to select a particular node 14 for transmission on a light-trail when multiple nodes 14 request use of the light-trail. As noted above, NMS 126 may represent a portion or all of EMSs 124 of all nodes 14 in optical network 10. Moreover, although the description below describes particular embodiments of optical network 10 in which functionality is divided between NMS 126 and EMSs 124 in a particular manner, in alternative embodiments the described functionality may be distributed between NMS 126 and EMSs 124 in any appropriate manner. Additionally, although NMS 126 and EMS 124, as shown in FIG. 2, represent, at least in part, components located within node 14, some or all of NMS 126 and/or EMS 124 may be located external to nodes 14.

Although not shown in FIG. 2, node 14 may also include a memory operable to store code associated with EMS 124, NMS 126, and/or other components of optical network 10, information specifying a wavelength assignment scheme utilized for protection traffic on optical network 10, and/or any other suitable information used during operation of optical network 10. Memory may represent one or more memory devices that are located within node 14 or that are physically separate from node 14. Additionally, memory may be shared with other components of optical network 10 including other nodes 14. Memory may represent computer disks, a hard disk memory, random access memory (RAM), read-only memory (ROM), or any other suitable storage media.

In operation, transport elements 50 receive traffic from fibers 16 and 18. In the illustrated embodiment, traffic received from fibers 16 and 18 includes an OSC signal, and transport elements 50 are operable to add and drop the OSC signal to and from fibers 16 and 18. More specifically, each OSC ingress filter 66a processes an ingress optical signal from its respective fiber 16 or 18. OSC ingress filter 66a filters the OSC signal from the optical signal and forwards the OSC signal to its respective OSC receiver 112. Each OSC ingress filter 66a also forwards the remaining transport optical signal to the associated amplifier 64. Amplifier 64 amplifies the signal and forwards the signal to its associated coupler 60a. In particular embodiments, amplifier 64 may be omitted, depending on the circumstances.

EMS 124 may process control messages transmitted by other nodes 14 or other components of optical network 10 and adjust operation of node 14 in response. In particular, EMS 124 may reconfigure WBU 54, transmitters 104, filters 100, receivers 102, and/or any other appropriate element of node 14 in response to control messages received by EMS 124. As one example, EMS 124 may, in response to receiving a setup message, configure a WBU 54 of node 14 to allow traffic propagating at a particular wavelength to pass through WBU 54. As another example, EMS 124 may, in response to receiving an intimation message from another node 14, tune a particular filter 100 and/or a particular receiver 102 to allow node 14 to receive optical traffic on a particular wavelength associated with a light-trail.

Furthermore, EMS 124 may also generate control messages for transmission to other nodes 14 or other components of optical network 10. For example, EMS 124 may generate electronic signals associated with setup messages, intimation messages, request messages, and/or any other appropriate type of control messages and communicate these electronic signals to OSC transmitter 116 to transmit optical signals representing the appropriate control message to the associated transport element 50. These control messages may then be added to the optical traffic on fiber 16 or 18, as appropriate.

Meanwhile, coupler 60a splits the signal from the amplifier 64 into two copies: a through signal that is forwarded to WBU 54 and a drop signal that is forwarded to distributing/combining element 80. Distributing/combining element 80 may then split the drop signal into one or more copies and forward the copies of the drop signal to one or more drop elements 130. In a particular embodiment, each drop element 130 includes a drop switch 132 that allows drop element 130 to selectively couple a drop signal from either fiber 16 or fiber 18 to a filter 100 included in that drop element 130. Additionally, filter 100 may be tuned to a particular wavelength. As a result, in such an embodiment, traffic propagating at a particular wavelength on the selected fiber is output to burst ponder 150.

Burst ponder 150 receives the output of a plurality of drop elements 130. A receiver 102 in burst ponder 150 that is associated with each drop element 130 converts the optical signal received from that drop element 130 into data traffic. The data traffic generated by each receiver 102 is then output to switching element 160. In particular embodiments of node 14, burst ponder 150 may include buffers (not shown) and the output of receivers 102 may be stored in one or more buffers to be transmitted to switching element 160 at an appropriate time. For example, as described in further detail below, burst ponder 150 may receive traffic shaping information (via the control channel or otherwise) indicating how traffic received over a light-trail should be communicated to switching element 160 and appropriate client devices. Burst ponder 150 may thus buffer traffic for a specified time according to the traffic shaping information to create a seamless flow of traffic from the burst ponder 150 to associated client devices.

Switching element 160 receives seamless and continuous data traffic output by burst ponder 150 and switches this data traffic in any appropriate manner to facilitate transmission of this data traffic to an appropriate client device of node 14. The data traffic received by switching element 160 from burst ponder 150 may include information in the form of packets, frames, and/or datagrams, and/or information structured in any other appropriate form. For example, in a particular embodiment, switching element 160 may represent an L2 switch and may receive electrical signals from burst ponder 150 in the form of packets.

Switching element 160 also receives data traffic from client devices coupled to switching element 160 and switches this data traffic to communicate the data traffic to an appropriate port of burst ponder 150. The data traffic received by switching element 160 from the client devices may include information in the form of packets, frames, and/or datagrams, and/or information structured in any other appropriate form. As noted above, switching element 160 may represent an L2 switch and may receive data traffic from the client devices in the form of packets. In such an embodiment, the L2 switch may switch each packet, based on a header included in that packet, to deliver the packet to a port of the L2 switch coupled to an appropriate port of burst ponder 150.

Burst ponder 150 receives data traffic from switching element 160 on one or more ports of burst ponder 150. Certain ports of burst ponder 150 are configured to receive data traffic from switching element 160, and each of these ports may pass the received data traffic to a particular transmitter 104 in burst ponder 150 associated with that port. Each transmitter 104 may then generate a burst of optical traffic from the data traffic received from switching element 160 and transmit that optical traffic to a particular add element 140 associated with that transmitter 104. In particular embodiments, EMS 124 may tune transmitters 104 of burst ponder 150, and transmitters 104 may generate optical traffic at a particular wavelength determined by EMS 124. In other embodiments, transmitters 104 transmit at a fixed wavelength.

Additionally, burst ponder 150 may include one or more buffers that store data traffic from switching element 160 to be input to transmitter 104 at an appropriate time (such as when the node is granted use of a light-trail). Such buffering is useful since a node 14 may not be able to transmit traffic when it is received because another node 14 is using a shared light-trail. Furthermore, when particular traffic is ready to be transmitted on a light-trail, burst ponder 150 may also generate traffic shaping information to be sent just prior to or along with the traffic. As described above, this traffic shaping information is used by the receiving burst ponder 150 to shape the traffic for communication to associated client devices.

Optical traffic output by transmitters 104 of burst ponder 150 is then received by an appropriate add element 140 associated with the transmitter 104 that generated the optical traffic. Each add element 140 may include an add switch 142 capable of selectively coupling that add element to a combiner 84 in a distributing/combining element 80 associated with either fiber 16 or 18. As a result, optical traffic generated by transmitters 104 of burst ponder 150 may be added to an appropriate fiber 16 or 18 based on the circumstances. For example, particular embodiments of node 14 may support protection switching and add switch 142 may be reconfigured in response to the detection of a fault on one fiber to transmit optical traffic on the other fiber. The appropriate distributing/combining element 80 then forwards the optical traffic received from burst ponder 150 to the coupler 60b of the associated fiber.

Returning to the operation of couplers 60a, in addition to forwarding the drop signal as described above, each coupler 60a forwards the through signal to its respective WBU 54. WBUs 54 receive the optical signal and selectively terminate or forward channels of the through signal. In a particular embodiment of node 14, EMS 124 may control operation of WBU 54 to establish a light-trail on a specified wavelength on a particular fiber 16 or 18 in response to a setup message received from a convener node 14a. In particular, if node 14 represents a node on the interior of the requested light-trail, EMS 124 may configure WBU 54 to allow optical signals propagating at the specified wavelength on the relevant fiber to pass through WBU 54. If node 14 represents a node 14 at the beginning or end of a light-trail, EMS 124 may configure WBU 54 to block optical signals propagating at the specified wavelength on the relevant fiber. In this way, traffic transmitted by a node in a light-trail does not leave the light-trail. Because of this, multiple non-overlapping light-trails may be formed using the same wavelength in the same fiber.

In particular embodiments, however, WBUs 54 may be omitted from the node. In such embodiments, the node will be unable to block the transmission of traffic through the node (since there would be nothing to terminate any of the wavelengths of the copy of the optical signal forwarded from couplers 60a). Therefore, in such embodiments, multiple light-trails may not be formed in the same wavelength. However, in many network topologies, such as ring networks, at least one such node (or some other device in the network) must be able to stop the propagation of optical signals added from the nodes around the network to prevent interference. As an example, otherwise traffic being added in a particular wavelength at a node will propagate around the network and return to the adding node, where it will interfere with new traffic being added in that wavelength. Therefore, particular embodiments may include one or more nodes that include a WBU (such as nodes 14) and one or more other nodes that do not include a WBU. If multiple nodes that include a WBU are used in such embodiments, it may be possible to create multiple light-trails in a single wavelength; however, the locations of these light-trails would be limited according to the number and placement of the nodes including the WBUs.

Returning to the operation of the illustrated node 14, each coupler 60b may subsequently combine the output of the associated WBU 54 with the traffic received from an associated combiner 84. After coupler 60b adds locally-derived traffic to the output of WBU 54, coupler 60b forwards the combined signal to the associated amplifier 64 and OSC egress filter 66b. Each OSC egress filter 66b adds an OSC signal from the associated OSC transmitter 116 to the combined optical signal and forwards the new combined signal as an egress transport signal to the associated fiber 16 or 18 of optical network 10.

Figure 3:
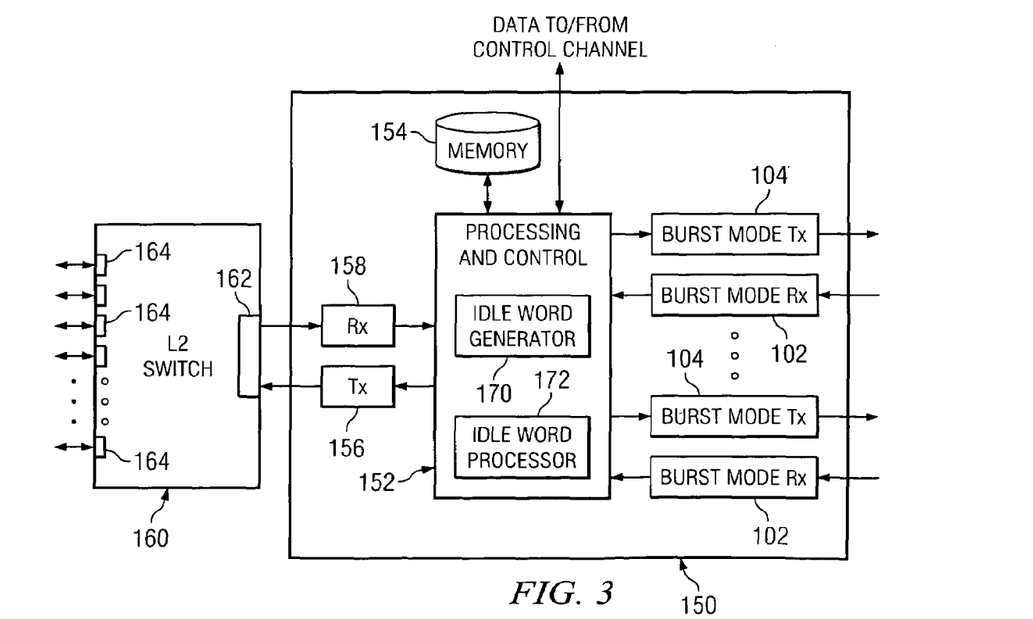
FIG. 3 is a block diagram illustrating a particular embodiment of a burst ponder that may be utilized in an optical network implementing light-trails.

FIG. 3 is a block diagram illustrating a particular embodiment of a burst ponder 150 that may be utilized in an optical network implementing light-trails. As described above, burst ponder 150 (in association with switching element 160) converts burst or time-interleaved optical traffic received from nodes in one or more light-trails to seamless and continuous data traffic for delivery to client devices of the with which it is associated. Furthermore, burst ponder 150 converts data traffic received from client devices of the associated node to optical traffic for transmission on the light-trail when the associated node has use of the light-trail. This allows the node to time share a light-trail while creating an impression to client devices of the node that the wavelength is available on a seamless and continuous basis.

Burst ponder 150 may be coupled to or integrated with switching element 160 (as discussed below). Switching element 160 may represent any appropriate component or components for transmitting data traffic output by burst ponder 150 to appropriate client devices and for transmitting data traffic received from client devices to burst ponder 150. In the illustrated embodiment, switching element 160 comprises an L2 switch. Switching element 160 includes a uplink/network port 162 through which it communicates with burst ponder 150 and multiple client ports 164 through which it communicates with client devices.

As illustrated in FIG. 2, burst ponder 150 may include any appropriate number of receivers 102 operable to receive optical signals and generate electrical signals based on these optical signals and transmitters 104 operable to receive electrical signals and to transmit optical signals based on these electrical signals. Each of these receivers 102 and transmitters 104 is a burst-mode receiver or transmitter. Such burst-mode receivers may have burst mode clock and data recovery operation. A burst mode transmitter 104 is used since data cannot be transmitted continuously from a node, but may only be transmitted at particular moments (such as particular time slots) when the associated node has the use of a light-trail. Burst mode optics in each transmitter 104 allow for the laser of each transmitter 104 to be turned on and off quickly to facilitate such burst transmissions. Similarly, a burst mode receiver 102 is used since data or other signals are not continuously received from the light-trail and thus the receiver 102 must be ready to receive data when it is available. Burst mode optics in the receiver allow for fast gain adjustment, which enables a shorter guard time (time when no data is able to be transmitted on the light-trail). Furthermore, in addition to sending and receiving traffic via receivers 102 and transmitters 104, burst ponder 150 is also able to send information to and receive information from the control channel (as indicated in FIG. 3). For example, burst ponder may send information to and receive information from EMS 124 and/or may send information directly to OSC transmitter 116*a* and receive information directly from OSC receiver 112.

Burst ponder 150 also includes a processing and control module 152 and associated memory 154. Module 152 may be any suitable type of processing device or devices programmed to perform the functions described herein (or any other suitable functions) and memory 154 may be any suitable type of data storage device. Module 152, among other functions, may perform packet/frame processing and queuing, optical payload assembly and disassembly, and traffic control functions. For example, Ethernet frames or data traffic in any other suitable format (for example, ATM, Frame Relay, or Fiber Channel formats) is received from client devices via switching element 160 and is buffered and assembled into an optical payload. The traffic is then queued (for example, in a buffer in memory 154) until the node with which burst ponder 150 is associated has the use of the light-trail over which the traffic is to be transmitted. Module 152 may receive control messages identifying the light-trails in which the associated node is included and may determine the light-trail over which incoming traffic is to be sent based on the address information in the incoming client traffic from switch 160. Each light-trail may have a buffer associated with it or multiple light-trails may share a buffer. When a time slot for transmission in a light-trail is assigned via a control protocol, the burst mode laser of the transmitter 104 associated with the appropriate light-trail is turned on and the optical payload is transmitted onto the network. At the end of the assigned time slot, the laser is turned off and incoming data to be transmitted on that light-trail is accumulated in the buffer until the next assigned time slot. For traffic received by a node from a light-trail, an associated burst mode receiver 102 converts the received optical payload into an electrical signal. The Ethernet frames (or other traffic format) of the electrical signal are disassembled from the optical payload by module 152 and are sent to switching element 160 for delivery to an appropriate destination client device(s). In addition to the functions described above, module 152 may also perform other types of packet processing in certain embodiments, such as Class of Service (CoS) classification and queuing, filtering, and any other suitable type of processing. Furthermore, module 152 may report the status of the traffic queues (full, empty, etc.) to a bandwidth controller to assist in dynamic bandwidth (for example, time slot) allocation in the light-trail(s) associated with the node.

As described above, in particular embodiments, a burst ponder 150 generates and transmits traffic shaping information prior to or along with the traffic being transmitted by the transmitting burst ponder over a light-trail to indicate to the receiving burst ponder(s) 150 how and when the traffic being transmitted should communicated from the receiving burst ponder to associated client devices. Such traffic shaping allows the seamless and continuous communication of traffic to the client devices, even though the transmission of the traffic over the light-trail is burst. Again, an example traffic shaping process is described in further detail below in conjunction with FIG. 6, which describes the generation and transmission of an "idle word," which is one type of traffic shaping information that may be used. Accordingly, burst ponder 150 may include an idle word generator 170 that generates an idle word associated with traffic being sent by the burst ponder 150 and that communicates this idle word in association with the traffic (via the control channel or otherwise), as described below in FIG. 6.

Furthermore, burst ponder 150 may include an idle word processor 172 that receives traffic shaping information from other burst ponders (via the control channel or otherwise) indicating how traffic received over a light-trail should be communicated to switching element 160 and appropriate client devices. Burst ponder 150 may thus buffer traffic in memory 154 for a specified time according to the idle word to create a seamless flow of traffic from the burst ponder 150 to associated client devices, again as described below in conjunction with FIG. 6.

Traffic may be communicated between burst ponder 150 and switching element 160 using any suitable technique. In the illustrated embodiment, one or more optical transmitters 156 and receivers 158 are used to communicate traffic optically between burst ponder 150 and switching element 160. As an example only, transmitter(s) 156 and receiver(s) 158 may be Small Form-factor Pluggable (SFP) optical components. Data traffic is received from module 152 at transmitter 156 and is converted to optical traffic for communication to uplink/network port 162 of switching element 160. In this case, port 162 includes an optical receiver or other suitable components to convert the received optical traffic back to data traffic for communication to one or more client ports 164. Similarly, in the illustrated embodiment, data traffic from client devices is communicated from client ports 164 to uplink/network port 162, where the traffic is converted to optical traffic. This optical traffic is then communicated to and received by receiver 158, which converts the optical traffic back to data traffic and communicates this data traffic to module 152 for processing.

An optical interface between burst ponder 150 and switching element 160 allows for burst ponder 150 and switching element 160 to be separated by a much greater distance than an electrical interface allows (for example, an electrical interface at 1 Gb/s to 10 Gb/s is limited to a few meters, while an optical interfaces allows switching element 160 and burst ponder 150 to be a few kilometers apart). However, in situations where burst ponder 150 and switching element 160 are closely positioned, optical transmitter 156 and receiver 158 may be replaced by an electrical input/output interface (and similar changes may be made to uplink/network port 162). In such a case, no electrical-optical-electrical conversion is needed when communicating traffic between burst ponder 150 and switching element 160.

Moreover, although burst ponder 150 and switching element 160 are shown as discrete devices (for example, cards), they may be integrated into a single device. When so integrated, burst ponder 150 and switching element 160 may share resources such as memory and a processor/controller (and associated functionality). Switching element 160 may be modified to perform as a burst ponder by modifying the switch interfaces to support burst mode optics and providing buffers for optical payload assembly and disassembly. Furthermore, control functionality may be added to turn the lasers associated with the burst mode optics on and off during an assigned time slot. Such an integrated burst ponder/switching element may either be part of a node 14 (for example, as a line card in a WDM platform) or external to a node 14 (for example, a part of a switch card).

Figure 4A:
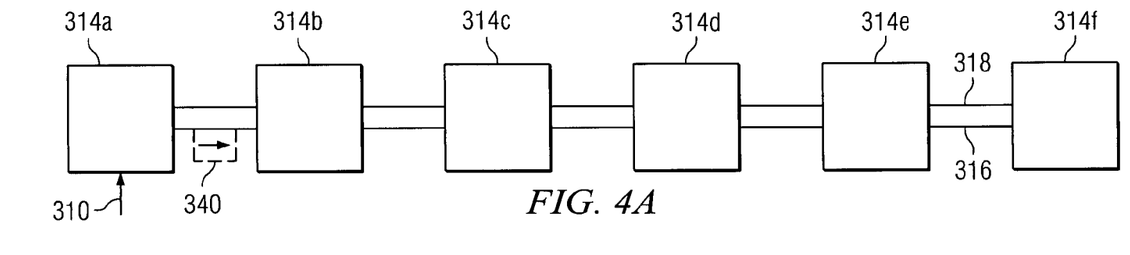
FIGS. 4A-4C illustrate example operation of nodes of an optical network in establishing a light-trail.
Figure 4B:
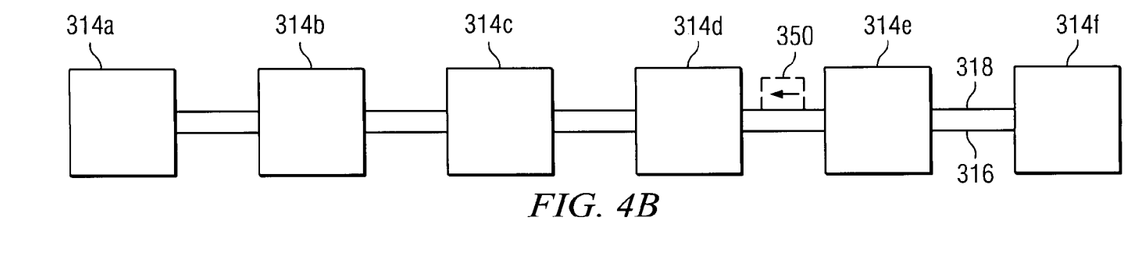
Figure 4C:
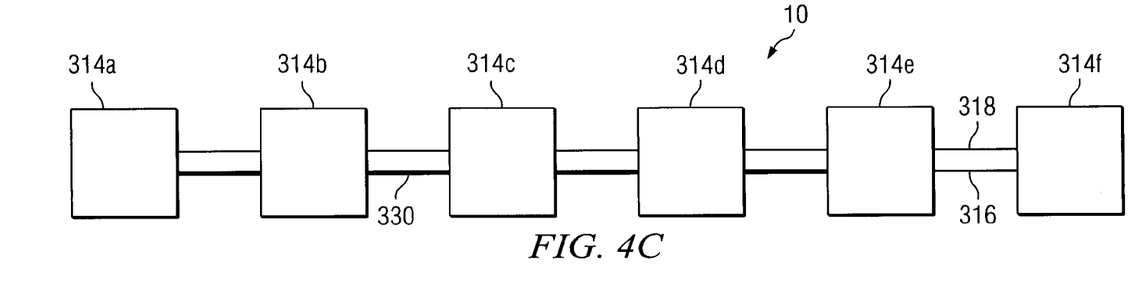

FIGS. 4A-4C illustrate example operation of nodes of an optical network in establishing a light-trail 330 (shown in FIG. 4C). In particular, FIGS. 4A-4C illustrate an example operation of a particular embodiment of an optical network as a particular node 314 attempts to establish a light-trail 330 in response to receiving data traffic from a client device of that node 314. Nodes 314 and fibers 316 and 318 shown in FIGS. 4A-4C may represent a complete optical network or may represent a portion of a larger optical network, such as optical network 10 shown in FIG. 1. Furthermore, although shown as being coupled in a linear manner, nodes 314 may be coupled in a ring, a mesh, or in any other suitable fashion. For example, nodes 314a-f may represent nodes 14a-f of network 10 of FIG. 1. Moreover, nodes 314 may have any suitable design. As an example only, nodes 314 may be implemented using the configuration illustrated in FIG. 2 or any other appropriate configuration.

FIG. 4A illustrates an example operation of an optical network as node 314a (referred to below as "convener node 314a") receives data traffic 310 from a client device coupled to convener node 314a. To transmit optical traffic based on the data traffic, convener node 314a determines that a light-trail 330 should be established between convener node 314a and node 314e (referred to below as "end node 314e") along fiber 16. As indicated above, convener node 314a may decide to establish light-trail 330 in response to determining that the amount of optical traffic flowing on other light-trails that couple convener node 314a and end node 314e exceeds a predetermined threshold. Alternatively, any other node or device may initiate the establishment of light-trail 330 for any suitable purpose.

Convener node 314a may establish light-trail 330 by sending one or more control messages to end node 314e and/or other nodes 314 on the OSC or other control channel. As used herein, a "message" may represent one or more signal pulses, packets, or frames, or information structured in any other suitable format. For example, in a particular embodiment, convener node 314a transmits a setup message 340 to end node 314e and to all nodes 314b-d between this particular convener node 314a and end node 314e in the direction of traffic. These nodes between the convener node and end node that are to be included in the light-trail may be referred to as "intervening nodes" (it should be noted, however, that not every node between the convener node and end node need be included in a light-trail). Depending on the configuration of the optical network, convener node 314a may transmit setup message 340 on the OSC in the same direction as optical traffic is flowing on fiber 316, in the opposite direction (for example, the OSC on fiber 318), or in both directions (for example, the OSC on both fibers 16 and 18). In the illustrated example, the OSC is assumed to represent a separate wavelength from the wavelengths used to transmit data on fiber 316, and convener node 314a transmits setup message 340 on fiber 318 in the direction traffic is propagating on fiber 316.

Setup message 340 may identify convener node 314a and end node 314e, specify the direction and wavelength to be used for transmissions on light-trail 330, and/or include any other appropriate information to be used by intervening nodes 314b-d and end node 314e to establish light-trail 330. Intervening nodes 314b-d may store setup message 340 until receiving an appropriate indication from end node 314e, such as an acknowledgement message, that end node 314e is prepared to establish light-trail 330.

FIG. 4B illustrates an example operation of the optical network after end node 314e receives setup message 340. End node 314e, in response to receiving setup message 340, may reconfigure a wavelength blocking unit of end node 314e to prevent traffic propagating at the wavelength associated with the requested light-trail 330 from continuing past end node 314e on fiber 316. End node 314e transmits an acknowledgement message 350 to convener node 314a and/or intervening nodes 314b-d once end node 314e has configured the wavelength blocking unit or at any other appropriate time after receiving setup message 340. Acknowledgement message 350 indicates to nodes 314 receiving the acknowledgment message that end node 314e is ready to establish light-trail 330. Convener node 314a and/or intervening nodes 314b-d may configure themselves in any appropriate manner to facilitate establishment of the light-trail, in response to receiving the acknowledgement message 350 or another appropriate form of indication from end node 314e. For example, intervening nodes 314b-d may each reconfigure a wavelength blocking unit of each node 314 to allow the wavelength associated with light-trail 330 to pass through that particular node 314. Additionally, convener node 314a may configure a wavelength blocking unit of convener node 314a to block traffic propagating on fiber 316 at the wavelength, as described above with respect to FIG. 2. By blocking traffic propagating on fiber 316 at the wavelength associated with light-trail 330, convener node 314a may allow other light-trails that do not overlap with light-trail 330 to utilize the same wavelength as light-trail 330 without interfering with traffic transmitted on light-trail 330.

Additionally, each node 314 may maintain a light-trail table or matrix that maintains information regarding light-trails established on optical network 10 or light-trails to which that node 314 is coupled. These light-trail tables may include any appropriate information for the relevant light-trails. For example, light-trail tables may include information specifying the convener node and end node of each light-trail, the wavelength associated with each light-trail, whether each light-trail is currently being used, and/or any other suitable information about each light-trail.

FIG. 4C illustrates a state of optical network 10 after node 314a receives acknowledgement message 350 and performs any appropriate reconfiguration. As a result of the reconfiguration of convener node 314a, intervening nodes 314b-d and end node 314e, light-trail 330 is formed which couples convener node 314a to each intervening node 314b-d and to end node 314e. Once light-trail 330 is established, convener node 314a and/or intervening nodes 314b-d may utilize light-trail 330 for transmissions to downstream intervening nodes 314b-d or to end node 314e. Example operation of nodes in transmitting optical traffic on an established light-trail is described below with respect to FIGS. 5A and 5B.

Figure 5A:
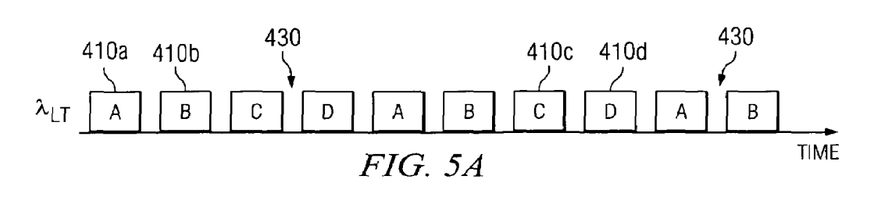
FIGS. 5A and 5B illustrate the use of time slots of a light-trail to share the light-trail between the nodes included in the light-trail.
Figure 5B:
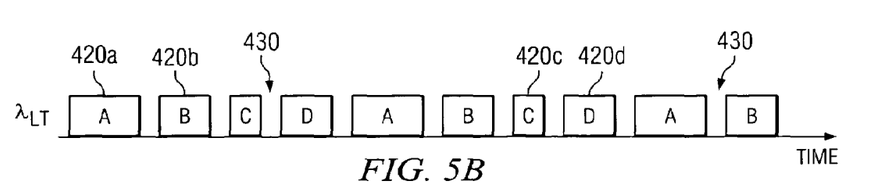

FIGS. 5A and 5B illustrate the use of time slots of a light-trail to share the light-trail between the nodes included in the light-trail. As illustrated, the data channel/wavelength at which a light-trail is established ($\lambda_{LT}$) may be divided into a plurality of time slots 410 or 420 to allow sharing of the light-trail between the nodes included in the light-trail. Unlike a structured time division multiplexed (TDM) system, these time slots are not frames or cells that include structure such as headers and other control information. They may simply be a specified duration of time on the data channel that is assigned to different nodes in the light-trail. Furthermore, there may be a gap or pad 430 between each time slot 410 or 420.

The duration of each time slot in a data channel of a light-trail may be equal or may vary. For example, FIG. 5A illustrates an example "round robin" technique for allocating use of a light-trail in which the time slots 410 associated with each node in the light-trail are equal. Many other suitable techniques may be used. The example time slots 410 may be associated, as an example, with light-trail 330 of FIG. 4C that includes nodes 314a-e. In that case, any of nodes 314a-d may transmit data on light-trail 314 (node 314e, as the end node, does not transmit data on the light-trail). Therefore, each node 314a-d may be assigned associated time slots 410 in which the nodes 314 may transmit data. In the illustrated example, node 314a is assigned time slots 410a (identified with an "A"), node 314b is assigned time slots 410b (identified with a "B"), node 314c is assigned time slots 410c (identified with a "C"), and node 314d is assigned time slots 410d (identified with an "D"). The size of these time slots 410 are equal, such that each node is able to transmit the same amount of traffic on the light-trail. Since each of the nodes may receive data to be transmitted in different amounts and at different rates, each node may buffer traffic to be transmitted accordingly.

However, certain nodes have a need to transmit data at a higher rate than is provided by the associated time slots 410 in this "round robin" system, while other nodes in the light-trail may not need the bandwidth/capacity provided by the associated time slots 410. To address this issue, a "weighted round robin" technique may be used, as illustrated in FIG. 5B. The duration of the time slots 420 associated with each node may be different. In other words, the length of the time slots may be weighted such that certain nodes are allocated more of the bandwidth of the light-trail in which to transmit than other nodes. Again, the example time slots 420 may be associated, as an example, with light-trail 330 of FIG. 4C that includes nodes 314a-e. In the illustrated example, node 314a is assigned time slots 420a (identified with an "A") that are longer in duration that the time slots 420 associated with the other nodes, node 314b is assigned time slots 420b (identified with a "B") and node 314d is assigned time slots 420d (identified with an "D") which are the same size and which are smaller than slots 420a, and node 314c is assigned time slots 420c (identified with a "C") which are smaller than slots 420a-c. In this manner, nodes on the light-trail that have higher bandwidth requirements may be given more capacity to transmit. In other embodiments, this same result may be accomplished using equally sized time slots, but allocating more time slots to certain nodes than to other nodes.

The duration of slots 410 or 420 may be configured via NMS 126 when the network is initially configured (and may be changed as needed), when a light-trail is established, or at any other appropriate time. In particular embodiments, the duration of slots 410 or 420 is communicated from NMS 126 or another appropriate component to the end node of a light-trail when the light-trail is being established. The end node sends control messages to the other nodes in the light-trail indicating the duration and positioning of the time slots associated with each node. Although particular example techniques for configuring and using time slots are described herein, it should be understood that any other suitable techniques may be used.

Figure 6:
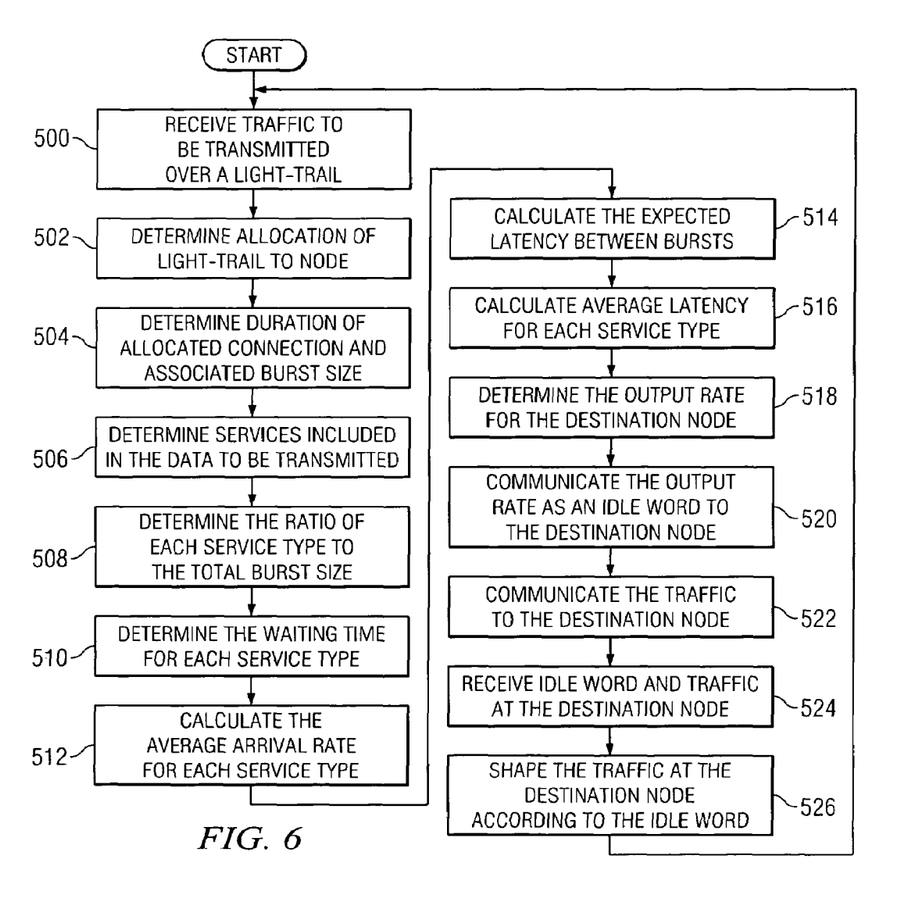
FIG. 6 is a flowchart illustrating an example method for shaping traffic communicated over a light-trail.

FIG. 6 is a flowchart illustrating an example method for shaping traffic communicated over a light-trail. The example method may be performed by at burst ponder and/or other appropriate components of a node that is transmitting traffic over a light-trail. For example, many of the steps (those involving the calculation of the idle word) may be performed by an idle word generator of the burst ponder. The method begins at step 500 where the node receives traffic to be transmitted over a particular light-trail. As described above, this traffic may be received by a burst ponder of the node from one or more client devices of the node via a switching element. The traffic may be stored in a buffer associated with the burst ponder until it is able to be transmitted over the light-trail. At step 502, the burst ponder determines whether and when the node with which the burst ponder is associated has been granted use of the light-trail. As described above, use of a light-trail may be allocated between the nodes in the light-trail in any suitable manner. For example, when using the round robin technique, the burst ponder simply determines when an pre-allocated time slot in the light-trail will be available to transmit the received traffic. When using a technique in which time slots in a light-trail are allocated dynamically (i.e., changing over time), then the burst ponder may determine when the associated node has been granted use of the light-trail based on information received over the control channel.

The method continues as step 504 where the burst ponder determines the duration of the time slot of the light-trail allocated to the node. Again, with respect to the round robin technique, this duration of the connection (a time slot) is fixed. In dynamic allocation techniques, this connection length may vary. Given the duration of the allocated connection, the burst ponder determines at step 504 a burst size that may be transmitted during the allocated connection. This burst size may be determined based on the following equation:

$$T_{slot}(i) = \frac{b}{C} + T_g$$

where b is the burst size in bits (or any other suitable unit), C is the line rate of the connection (for example, bits per second), $T_{slot}$ is length of the time slot allocated for transmission of traffic by node i, and $T_g$ is the guard time (time needed by the receiver to receive the traffic, during which traffic cannot be sent).

At step 506, the burst ponder determines the various service types that are included in the received traffic. For example, the traffic may include voice communications, data packets, and/or any other appropriate types of traffic. Each service type may have different bit rates and different requirements (such as latency requirements). At step 508, the burst ponder determines the ratio, $\sigma_{ij}$, of the amount of traffic for each service type with respect to the total burst size b (where i is the particular node and j is the service type). Thus, for each service type, $\sigma_{ij}$ will be a number between zero and one that represents the percentage of the total burst size that the service type comprises.

The method continues at step 510, where the burst ponder determines the wait time $A_{ij}$ associated with each service type j. This wait time is the time difference between the arrival of the first packet of a service type j and the time at which the burst was scheduled for transmission. For each service type, this wait time and the ratio of the service type to the total burst size may be used at step 512 to calculate the average arrival rate ($\lambda_{ij}$) for service j at node i as follows:

$$\lambda_{ij} = \frac{\sigma_{ij} b}{A_{ij}}$$

Furthermore, at step 514, the burst ponder may also determine the expected latency between bursts from the burst ponder (the amount of time that elapses between connections being allocated to the node). This expected latency, $\tau_i$, may be calculated as follows (where N is to total number of nodes in the light-trail):

$$\tau_i = \sum_{k=1, k \neq i}^{N-1} T_{slot}(k)$$

In other words, the expected latency for a node i is determined by summing the length of the time slots (or other allocated period of time) granted to each of the other nodes on the light-trail (except for the end node, which does not transmit traffic on the light-trail). For example, when using the round robin allocation technique, the expected latency may be determined by adding the length of all the time slots between two consecutive time slots assigned to node i. In other words, it is the length of time between consecutive time slots assigned to the node.

Based on this expected latency, an average latency for each service j can be calculated at step 516 as follows:

$$\frac{\sigma_{ij}b}{\tau_i}.$$

At step 518, using the average arrival rate and/or average latency for each service j, the burst ponder can determine the appropriate output rate to maintain seamless uninterrupted operation for service j at destination node k. In particular embodiments, the output rate for a particular service may be determined to be the maximum of either the average arrival rate or the average latency for that service. In other embodiments, only one of the average arrival rate and the average latency may be considered to set the output, as is appropriate. For example, the average latency may be used when the allocation technique is a "static" allocation technique (such as the round robin technique) in which the time slots allocated to a node do not change during the existence of a particular light-trail (or at least not often). On the other hand, the average arrival rate may be used as the output rate when a "dynamic" allocation technique is used (such a when nodes are granted use of the light-trail on an as-needed basis based on some sort of priority system).

At step 520, the burst ponder transmits the determined output rate for each service type as an idle word to the destination node to instruct the destination node how to shape the traffic being sent for communication to its client devices. The idle word may be communicated to the destination node via the control channel or in-band with the traffic in the light-trail. For example, the idle word may be transmitted at or near the beginning of a control slot associated with the data slot in which the traffic is being transmitted to the destination node. At step 522, the burst ponder transmits the traffic itself on the light-trail, and the destination node receives the idle word and the traffic at step 524.

At step 526, the destination node uses the output rate indicated by the idle word to shape the traffic for delivery the its client devices via the associated switching element. For example, the burst ponder of the destination node my classify the arriving traffic into the various service types and then communicate the traffic of each service type to the associated switching element at the output rate for that service type indicated in the idle word. The burst ponder can buffer the traffic as appropriate to facilitate this communication of the traffic at this rate. In the manner, the traffic in each service type is communicated in a seamless uninterrupted manner to the client devices despite the fact that the traffic associated with a particular service type is being communicated over the light-trail in bursts when the transmitting node is allocated use of the light-trail.

It should be noted that the time at which a burst is scheduled for transmission to the time at which the burst actually leaves the ingress node (i.e., the duration of $T_{slot}(i)$) may create a small anomaly since $\sigma_{ij}$ at the time the burst begins to leave the ingress node can be different from $\sigma_{ij}$ at the time the burst has completely left the ingress node. Therefore, in particular embodiments, in addition to the idle word sent to the egress node, the burst ponder may send an in-band end of burst frame that carries the new $\sigma_{ij}$ which may have changed due to real time arrival process at the end of the burst. The destination node can use this new $\sigma_{ij}$ as appropriate to determine a revised output rate, as described above.

The example method described above may be repeated for each time slot or other use of a light-trail that is allocated to a node. Furthermore, although steps of the example method are presented in a particular order above, it should be understood that these steps may be performed in any suitable order. Moreover, particular steps may not be performed and/or additional steps may be added within the scope of the present invention. In addition, although a particular technique for determining an idle word has been described, any other suitable techniques may alternatively or additionally be used.

Although the present invention has been described with several embodiments, various changes and modifications may be suggested to one skilled in the art. It is intended that the present invention encompass such changes and modifications as fall within the scope of the appended claims.

What is claimed:

1. A method for transmitting traffic in an optical network, the optical network operable to carry optical traffic in a plurality of multiplexed wavelengths between a plurality of nodes, the method comprising:
   establishing at least one light-trail in the optical network between a subset of the plurality of nodes, wherein the light-trail couples the subset of nodes and is associated with one of the plurality of wavelengths, wherein establishing the light-trail comprises transmitting one or more control messages on an out-of-band control channel that is associated with a different wavelength than the wavelength associated with the light-trail; and
   at one or more of the subset of nodes:
      receiving traffic from one or more client devices of the node to be communicated over the light-trail to a destination node;
      determining one or more service types associated with the received traffic;
      determining traffic shaping information for each service type based on information relating to the arrival of traffic associated with the service type at the node, the traffic shaping information operable to indicate to the destination node the rate at which the traffic associated with each service type should be communicated from the destination node to one or more client devices of the destination node, wherein the traffic shaping information comprises at least one of (i) an average arrival rate at the node of traffic associated with each service type and (ii) an average latency of traffic associated with each service type;
      transmitting the determined traffic shaping information for each service type to the destination node; and
      transmitting the traffic over the light-trail to the destination node during a time period at which the node has been allocated use of the light-trail.

2. The method of claim 1, wherein the traffic shaping information is transmitted to the destination node in the out-of-band control channel.

3. The method of claim 2, wherein the traffic shaping information is transmitted to the destination node in a time slot of the out-of-band control channel associated with a time slot of the light-trail in which the traffic is transmitted to the destination node.

4. The method of claim 1, wherein the traffic shaping information is transmitted to the destination node along with the traffic in the light-trail.

5. The method of claim 1, further comprising:
receiving the traffic and the traffic shaping information at the destination node;
classifying the traffic into its constituent service types; and
communicating the traffic of each service type to one or more client devices at an output rate for that service type indicated by the traffic shaping information associated with that service type.

6. An optical network operable to carry optical traffic in a plurality of multiplexed wavelengths between a plurality of nodes, the optical network comprising:
at least one light-trail established in the optical network between a subset of the plurality of nodes, wherein the light-trail couples the subset of nodes and is associated with one of the plurality of wavelengths;
an out-of-band control channel associated with a different wavelength than the wavelength associated with the at least one light-trail, the control channel being used to communicate one or more control messages to establish the light-trail and to allocate use of the light-trail by the subset of nodes; and
wherein one or more of the subset of nodes are operable to:
receive traffic from one or more client devices of the node to be communicated over the light-trail to a destination node;
determine one or more service types associated with the received traffic;
determine traffic shaping information for each service type based on information relating to the arrival of traffic associated with the service type at the node, the traffic shaping information operable to indicate to the destination node the rate at which the traffic associated with each service type should be communicated from the destination node to one or more client devices of the destination node, wherein the traffic shaping information comprises at least one of (i) an average arrival rate at the node of traffic associated with each service type and (ii) an average latency of traffic associated with each service type;
transmit the determined traffic shaping information for each service type to the destination node; and
transmit the traffic over the light-trail to the destination node during a time period at which the node has been allocated use of the light-trail.

7. The network of claim 6, wherein the traffic shaping information is transmitted to the destination node in the out-of-band control channel.

8. The network of claim 7, wherein the traffic shaping information is transmitted to the destination node in a time slot of the out-of-band control channel associated with a time slot of the light-trail in which the traffic is transmitted to the destination node.

9. The network of claim 6, wherein the traffic shaping information is transmitted to the destination node along with the traffic in the light-trail.

10. The network of claim 6, where the destination node is operable to:
receive the traffic and the traffic shaping information;
classify the traffic into its constituent service types; and
communicate the traffic of each service type to one or more client devices at an output rate for that service type indicated by the traffic shaping information associated with that service type.

11. An optical node operable to transmit and receive optical traffic in an optical network, the optical network including a plurality of optical nodes and at least one light-trail established between a subset of the plurality of optical nodes, wherein the light-trail couples the subset of nodes and is associated with one of a plurality of multiplexed wavelengths used to transport the optical traffic in the optical network, the optical node comprising:
one or more components operable to transmit and receive control messages on an out-of-band control channel associated with a different wavelength than the wavelength associated with the at least one light-trail, the control channel being used to communicate the control messages to establish the light-trail and to allocate use of the light-trail by the optical node;
a burstponder operable to:
receive traffic from one or more client devices of the node to be communicated over the light-trail to a destination node;
determine one or more service types associated with the received traffic;
determine traffic shaping information for each service type based on information relating to the arrival of traffic associated with the service type at the node, the traffic shaping information operable to indicate to the destination node the rate at which the traffic associated with each service type should be communicated from the destination node to one or more client devices of the destination node, wherein the traffic shaping information comprises at least one of (i) an average arrival rate at the node of traffic associated with each service type and (ii) an average latency of traffic associated with each service type;
transmit the determined traffic shaping information for each service type to the destination node; and
transmit the traffic over the light-trail to the destination node during a time period at which the node has been allocated use of the light-trail.

12. The optical node of claim 11, wherein the traffic shaping information is transmitted to the destination node in the out-of-band control channel.

13. The optical node of claim 12, wherein the traffic shaping information is transmitted to the destination node in a time slot of the out-of-band control channel associated with a time slot of the light-trail in which the traffic is transmitted to the destination node.

14. The optical node of claim 11, wherein the traffic shaping information is transmitted to the destination node along with the traffic in the light-trail.

* * * * *